United States Patent [19]

Rhoton et al.

[11] Patent Number: 4,471,929
[45] Date of Patent: Sep. 18, 1984

[54] TRANSIT VEHICLE SIGNAL APPARATUS AND METHOD

[75] Inventors: Richard S. Rhoton, Mt. Lebanon; Gregory J. Walz, Pittsburgh, both of Pa.

[73] Assignee: Westinghouse Electric Corp., Pittsburgh, Pa.

[21] Appl. No.: 353,137

[22] Filed: Mar. 1, 1982

[51] Int. Cl.³ .................... B61B 13/16; B61L 3/00
[52] U.S. Cl. ..................... 246/182 R; 246/63 R; 246/187 B
[58] Field of Search ............... 246/34 R, 63 R, 63 A, 246/36, 37, 167 R, 182 R, 182 B, 187 B

[56] References Cited

U.S. PATENT DOCUMENTS

| Re. 27,472 | 9/1972 | Thorne-Booth | 246/34 CT |
|---|---|---|---|
| 1,328,865 | 1/1920 | Woodward | 246/63 R |
| 3,532,877 | 10/1970 | Thorne-Booth | 246/63 |
| 3,746,857 | 7/1973 | Hoyler et al. | 246/36 |
| 3,821,544 | 6/1974 | Matty | 246/34 CT |
| 3,840,737 | 10/1974 | Hoyler | 246/63 R |
| 3,891,167 | 6/1975 | Perry | 246/34 R |
| 3,958,781 | 5/1976 | Woods et al. | 246/34 R |
| 3,966,149 | 6/1976 | Matty et al. | 246/34 R |
| 3,973,746 | 8/1976 | Ball | 246/187 B |

OTHER PUBLICATIONS

*IEEE Transactions on Communication Technology*, vol. COM-16, No. 3, Jun. 1968, Thorne-Booth, pp. 369-374.

*Westinghouse Engineer*, Hoyler, Sep. 1972, "Automatic Train Control . . . Equipment".

*IEEE Vehicular Technology Group*, "Atlanta Airport People Mover", Westinghouse Electric, Denver, Mar. 22, 1978.

*Primary Examiner*—James J. Groody
*Attorney, Agent, or Firm*—R. G. Brodahl

[57] ABSTRACT

An apparatus and method for providing a control signal in front of a vehicle moving along a track having an earth ground potential, with the vehicle having first and second low impedance interconnected collector shoes being coupled between a pair of signal rails and provided at respectively the front end and rear end of the vehicle. A first control signal is provided in front of the vehicle to control the desired operation of the vehicle and a second control signal is provided in the rear of the vehicle to control an undesired operation of the vehicle. An impedance member is provided, in a first conductive circuit on the vehicle or in a second conductive circuit associated with the track, to prevent the second control signal in front of the train from having a threshold level high enough to confuse the desired operation of the train.

10 Claims, 8 Drawing Figures

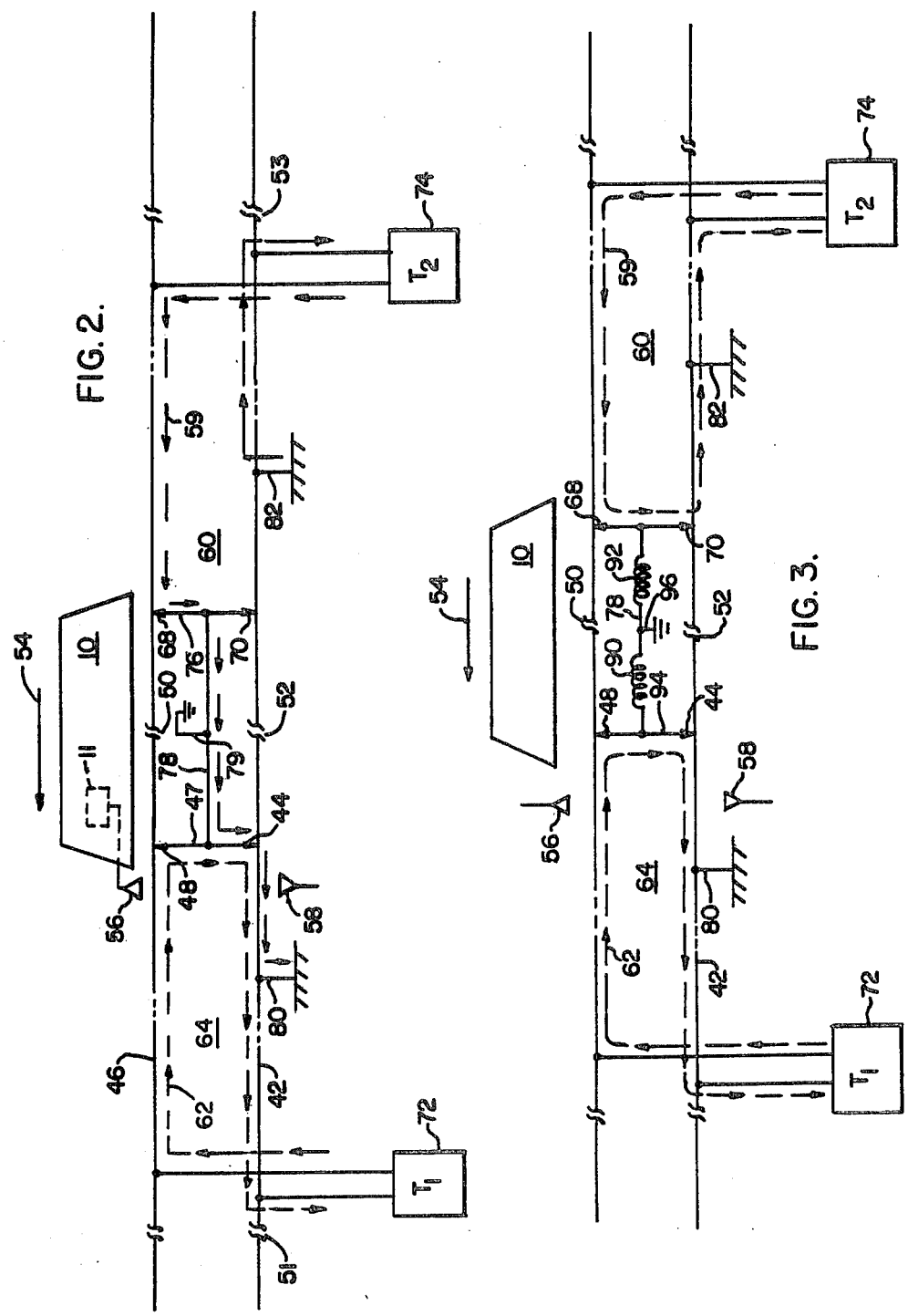

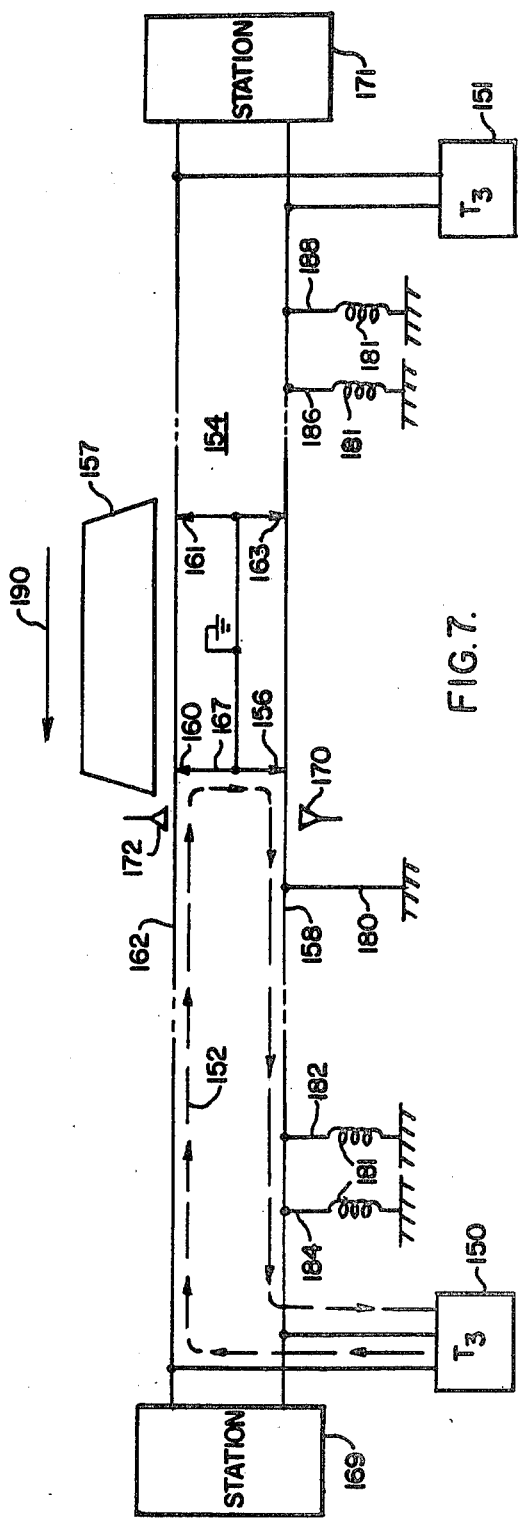

TRANSIT VEHICLE SIGNAL APPARATUS AND METHOD

BACKGROUND OF THE INVENTION

It has for some time been the practice in the operation of transit vehicle control signaling systems and particularly for rubber-tired transit vehicles to divide the track signal rails into a plurality of signaling blocks that are electrically insulated from each other. Such a rubber-tired transit vehicle system is described in an article published in the *Conference Record* of the 28th IEEE Vehicular Technology Group in relation to a meeting in Denver in March, 1978, and entitled "Atlanta Airport People Mover" in which there is described a guideway for such a transit system, including an electrically grounded guide beam which is located in the center of the vehicle support tracks, and including a power distribution apparatus consisting of five rails mounted on top of the guide beam. The three top rails distribute three-phase AC power, and the fourth and fifth rails provide guidance for the main collector shoes as well as a ground for the vehicle system, and are used for the provision of speed command signals to control the vehicles and detect the presence of the vehicles in each signal block.

The desired performance of such rubber-tired transit vehicles requires that the speed command signals to the cars be of a continuous nature even when the speed command signal changes. Typically, command signals are inductively coupled from current in the signal rails to the cars. As a car bridges the boundary between two command signal zones or blocks, currents of both the rear signal block and the front signal block can appear in the front signal block ahead of the car to cause a confusion zone. This has resulted in excessive control system transport delays that can cause poor system performance. The path of these rear command signal currents into the front signal block results from the need to keep the vehicle grounded for passenger safety reasons.

SUMMARY OF THE INVENTION

The undesired confusion zone command signal currents may be eliminated or reduced to an acceptable value by placing impedance providing members of proper value in relation to the frequency difference between the command signal frequencies as compared to the propulsion power frequency. These impedance providing members are placed between the ground rail of the power distribution apparatus and earth ground for a single block transit system, or these impedance providing members are placed on the car between the grounded car body and the collector shoes operative with the signal and ground rails of the power distribution network to stop or reduce the undesired confusion zone currents.

BRIEF DESCRIPTION OF THE DRAWINGS

In FIG. 2 there is schematically shown a transit vehicle physically positioned over an insulated joint provided in the signal and ground rails of the power distribution arrangement shown in FIG. 1.

FIG. 3 shows a transit vehicle positioned over the insulated joints of the signal and ground rails of a power distribution apparatus and including impedance providing members placed on the car and connected between the grounded car body and the collector shoes operative with those signal and ground rails.

FIG. 5 shows a multiple transit vehicle train positioned over the insulated joints of the signal and ground rails and including impedance providing members connected between the grounded car body and the collector shoes operative with the signal and ground rails.

FIG. 7 shows the impedance providing members connected between the ground rail of the signal block system and earth ground in accordance with the teachings of the present invention; and FIG. 8 shows impedance providing members connected in a parallel circuit arrangement carried by a transit vehicle and connected between the grounded car body and the collector shoes operative with the signal and ground rails of a multiple signal block system.

DESCRIPTION OF THE PREFERRED EMBODIMENT

The term confusion zone has been utilized in the prior art to identify a variety of vehicle dynamic control signal problems experienced as the vehicle traverses track signal block boundaries. During such a transition, the vehicle must acquire the new signal each time the vehicle enters a new signal block for determining the desired operating speed for the vehicle in that signal block. Since the vehicle receives the speed command signal by sensing a magnetic field in front of the vehicle as the vehicle passes from a rear signal block to a front signal block, there is a finite distance where each of the signal blocks are positioned in relation to the antennas in front of the vehicle such that the vehicle senses the command signal for the rear signal block and the command signal for the front signal block, which distance is less than two or three feet.

There is an additional confusion zone problem relates to the distance between the collector shoes of an individual transit vehicle, which exists due to ground loop currents. The resulting undesired speed command signal from the rear signal block can be in the order of 50% of the threshold level of the desired command signal in the front signal block; and, due to poor shunting operation of the collector shoes, the undesired signal from the rear signal block can even exceed the desired front signal block signal and must be considered when determining speed command signal response time.

Figure 1:
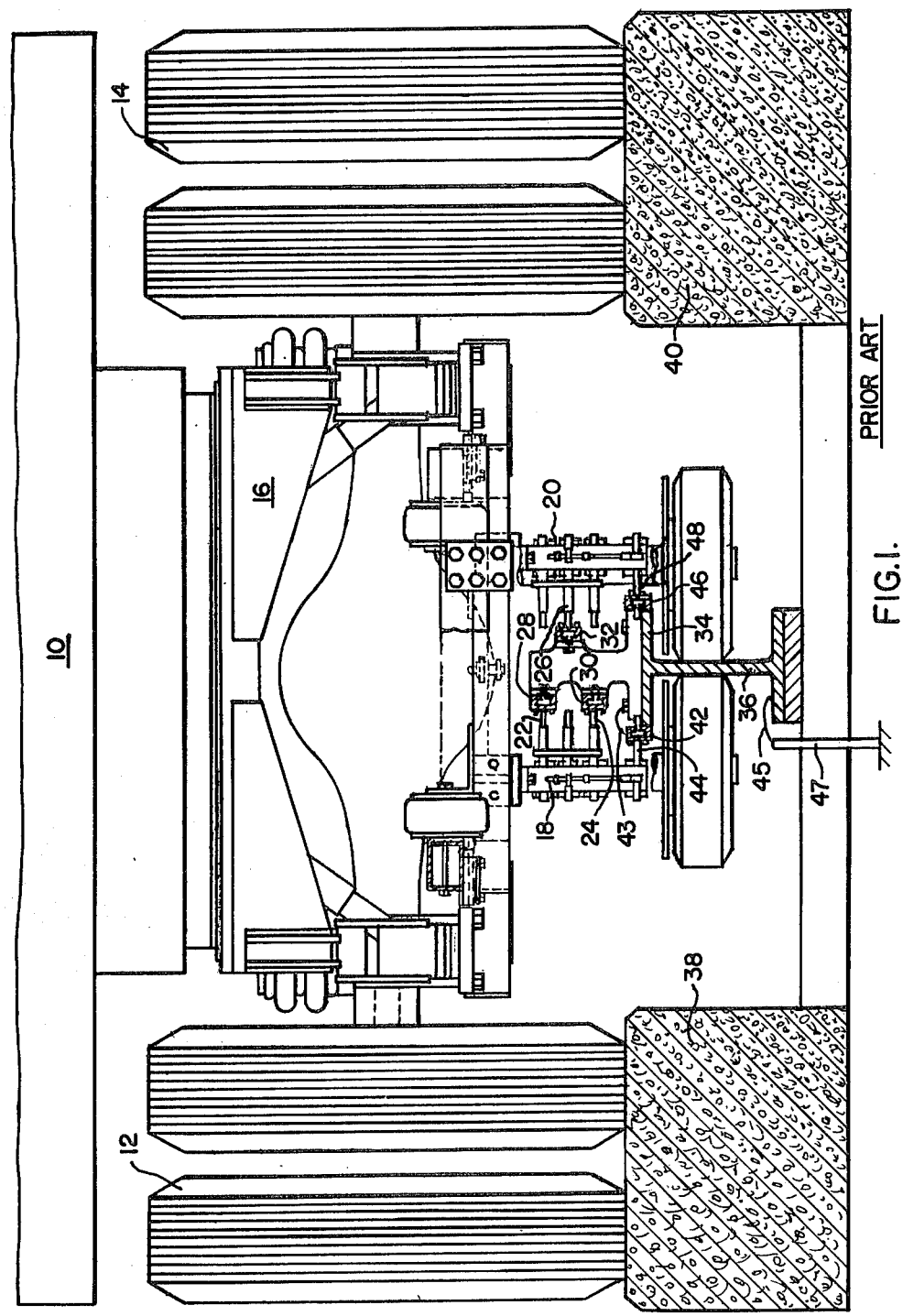
In FIG. 1 there is shown a prior art power distribution collector shoe arrangement in accordance with the disclosure of U.S. Pat. No. 4,168,770.

In FIG. 1 there is shown a prior art propulsion power distribution apparatus for a transit vehicle car 10 operative with dual pairs of support wheels 12 and 14 coupled with a support bogie apparatus 16. Below the bogie apparatus 16 there are fastened support members 18 and 20 for collector shoes 22, 24, and 26. The collector shoes cooperate with respective power rails 28, 30, and 32 supported above the top flange 34 of a guide beam 36 centrally positioned between the wheel support tracks 38 and 40 of the transit vehicle system. A more detailed description of this power distribution apparatus can be found in U.S. Pat. Nos. 4,090,452 of W. R. Segar and 4,168,740 of W. R. Segar and R. A. Larson, the disclosures of which are incorporated herein by reference. A ground rail 42 is shown operative with a collector shoe 44 and a signal rail 46 is shown operative with a collector shoe 48. The ground rail 42 is connected through conductor 43 with the guide beam 36, and the guide beam 36 is connected through conductor 45 with the earth ground member 47.

FIG. 2 shows a transit vehicle control signal sensing and vehicle safety grounding arrangement including sneak signal current paths for the rear signal block current in a multiple block track system. The vehicle car 10 is shown positioned over an insulating joint 50 provided in the signal rail 46 and an insulated joint 52 provided in the ground rail 42, which vehicle 10 is shown moving in the direction indicated by arrow 54. In front of the vehicle and carried by the vehicle are speed command signal sensing antennas 56 and 58. The control signal current sneak path problem for a transit vehicle involves having some of the control signal 59 from one or perhaps more than one transmitter behind the vehicle passing in front of the vehicle 10, such that the control signal antennas 56 and 58 in front of the vehicle 10 respond to this undesired signal 59 from the rear signal block 60 in relation to the desired command signal 62 in the signal block 64 ahead of the vehicle 10. The command signal 59 in the rear signal block 60 is theoretically short-circuited by the rear interconnected collector shoes 68 and 70 of the vehicle 10, such that the rear command signal current 59 does not pass beyond the insulated joints 50 and 52 into the signal block 64 ahead of the vehicle 10. However, in practice, due to undesired impedance provided by one or more of the rear collector shoes 68 and 70, the control signal 59 in the rear signal block 60 can pass beneath or through the vehicle 10 and be available at the front of the vehicle 10 where the antennas 56 and 58 can sense this undesired rear control signal 59, such that a control signal confusion problem results in relation to providing the desired control of the vehicle 10. It is desired for the vehicle 10 to respond to the front signal current 62 and not desired for the vehicle 10 to respond to the rear signal current 59. The antennas 56 and 58 in front of the vehicle 10 will respond to any signal current having a sufficient magnitude and which flows in proximity to the antennas 56 and 58. There is a command signal transmitter 72 in front of the vehicle 10 and providing a desired speed command signal current 62 into the front signal block 64 occupied by the front portion of the vehicle 10 for determining the operation of the vehicle 10. However, for the purpose of two-way running of the vehicle on that provided track, there is at least one rear command signal transmitter 74 providing the signal current 59 to the rear of the vehicle 10 and providing a safe zero speed control signal 59 into the rear signal block 60 occupied by the rear portion of the vehicle 10 for preventing vehicle operation in the rear direction. When one or more of the rear collector shoes 68 and 70 has a relatively high impedance, such as a quarter ohm and particularly when the vehicle straddles the insulated joints 50 and 52 as shown in the respective signal rail 46 and the ground rail 42, the rear shoes 68 and 70 which are interconnected by the conductor 76 might not operate as desired to short-circuit the rear control signal current 59. The conductor 76 is provided with the ground connection 79 to the car body of vehicle 10. The ground rail 42 is provided with an earth ground connection, such as 80 and 82, between each pair of insulated joints 51 and 52 and 52 and 53. In effect, a signal voltage divider action takes place, and this rear signal current 59 in the rear signal block 60 can then pass along an alternate path, such as shown in FIG. 2, through the car body connection 78, and out one of the front collector shoes, such as collector shoe 44 operative with the ground rail 42 as shown in FIG. 2, and into the front signal block 64 past the antenna 58, then through a provided earth ground connection 80 and back to the earth ground connection 82 in the rear signal block 60 coupled with the transmitter 74.

In FIG. 3 there is shown a first embodiment of the present invention provided for a multiple signal block track system, including impedance members 90 and 92, illustrated as inductor members, provided on the vehicle 10. If one of the rear collector shoes 68 or 70 has an unusually high impedance, this causes a voltage divider effect that can result in a portion of the rear signal block signal current 59 traveling through the vehicle body connection 78 and into the front signal block 64 as shown in FIG. 2. However, with the addition of the impedance members 90 and 92, it is seen that this circuit arrangement presents twice the inductor impedance in relation to signal currents passing from the rear connection 76 between the collector shoes 68 and 70, and the front connection 94 between the collector shoes 48 and 44. This circuit arrangement prevents the unwanted rear signal current 59 from appearing in the front signal block 64 and possibly in front of the vehicle signal antennas 56 and 58, depending upon the location of the earth ground connection 80 for the ground rail 42 of the front signal block 64. The arrangement of the impedance members 90 and 92 is such that twice the signal impedance presented by those impedance members is available in relation to the passage of the rear signal current 59 between the connections 76 and 94, but only half of this total impedance is presented for fault currents in relation to the car body ground connection 96. More specifically, one practical application of the present invention utilized inductor members 90 and 92 having an impedance of about 38 ohms at 5 kHz and about 76 ohms at 10 kHz, which is a practical range of signal frequencies of the front signal current 62 and the rear signal current 59, therefore the connections 76 and 94 were separated from each other by 75 to 150 ohms at these track signal frequencies. This arrangement results in all of the rear signal current 59 being short-circuited between the collectors 68 and 70 as shown in FIG. 3, or this results in substantially most of the signal current 59 not sneaking through to the vehicle body to the earth ground connection 80, such that the antennas 56 and 58 are not operative to sense the presence of the rear signal current 59.

Figure 4:
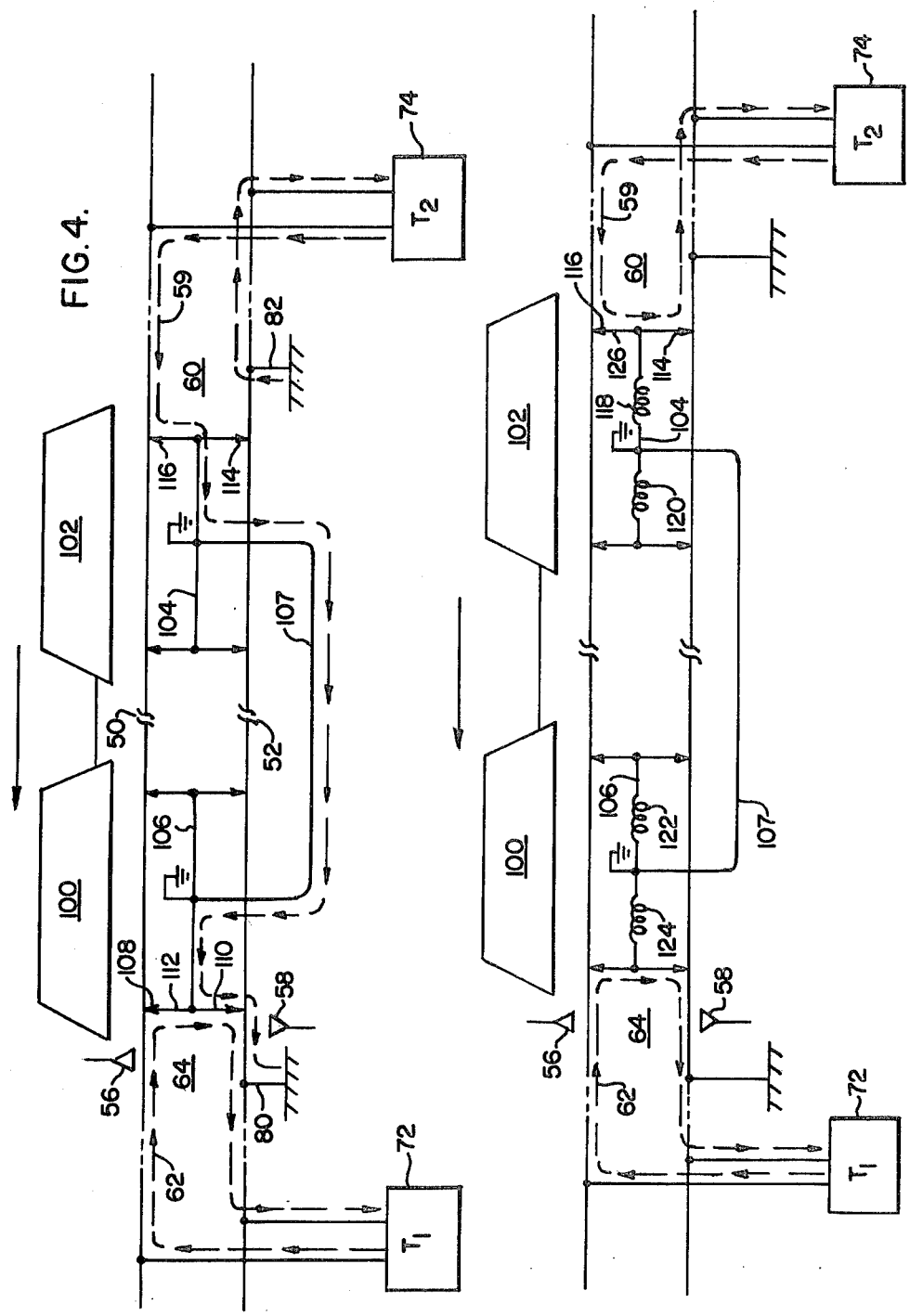
FIG. 4 shows a multiple transit car train positioned over the insulated joints of the signal and ground rails.

In FIG. 4 there is shown the sneak path circuit arrangement for the rear signal current 59 to pass through the car bodies of two coupled vehicles 100 and 102 which are positioned to bridge the insulated joints 50 and 52, such that the rear signal current 59 passes from the car body connection 104 of vehicle 102 to the car body connection 106 of vehicle 100 through the vehicle coupler connection 107, and in front of the lead car 100 where the antennas 56 and 58 can sense the rear signal block current 59. The signal current 62 in the front signal block 64 is shown to be short-circuited by the collector shoes 108 and 110 of the front car 100.

It should be understood that one purpose of the connection 112 between the collector shoes 108 and 110 is to short-circuit the signal current 62 in the signal block 64 as shown in FIG. 4 for indicating occupancy of the front signal block 64 by the vehicle 100 in accordance with the disclosure of reissue patent U.S. Pat. No. 27,472 of G. M. Thorne-Booth.

As shown in FIG. 4, for purpose of example, assume that the collector shoe 114 of the second vehicle 102 has a higher impedance than the collector shoe 116, such that a voltage divider effect is provided to cause the current 59 of the rear signal block 60 to pass through the car body grounded connections 104 and 106 and through the coupler connection 107 to in front of the vehicle 100 to the earth ground connection 80 of the front signal block 64 and then back to the rear earth ground connection 82 of the rear signal block 60 in relation to completing the undesired sneak circuit path for the current 59 from the transmitter 74.

In FIG. 5 there is shown the provision of the impedance members 118 and 120 in the car body grounded connection 104 and the impedance members 122 and 124 in the car body grounded connection 106 in accordance with the present invention, such that the current 59 of the rear signal block 60 is more effectively short-circuited by the connection 126 provided between the rear collector shoes 114 and 116. This assures that none or practically only a small amount of the rear signal current 59 can pass through the higher impedance body connections of the vehicle cars 100 and 102 and into the front signal block 64 where the antennas 56 and 58 ahead of the front car 100 can otherwise sense the rear command signal current 59 from the rear signal block 60.

For a multiple signal block track system with some smaller signal blocks and some larger signal blocks, a two-car train such as shown in FIG. 4 can straddle one or more such signal blocks, with the front collector shoes of the first car 100 being operative in a front signal block 64 and the cars 100 and 102 straddling over at least one middle second signal block and the rear collector shoes of the last car 102 being operative in a third signal block to the rear of the second signal block. Each set of the shunting collector shoes can provide the signal voltage divider effect and contribute to the control signal confusion problem here described.

Figure 6:
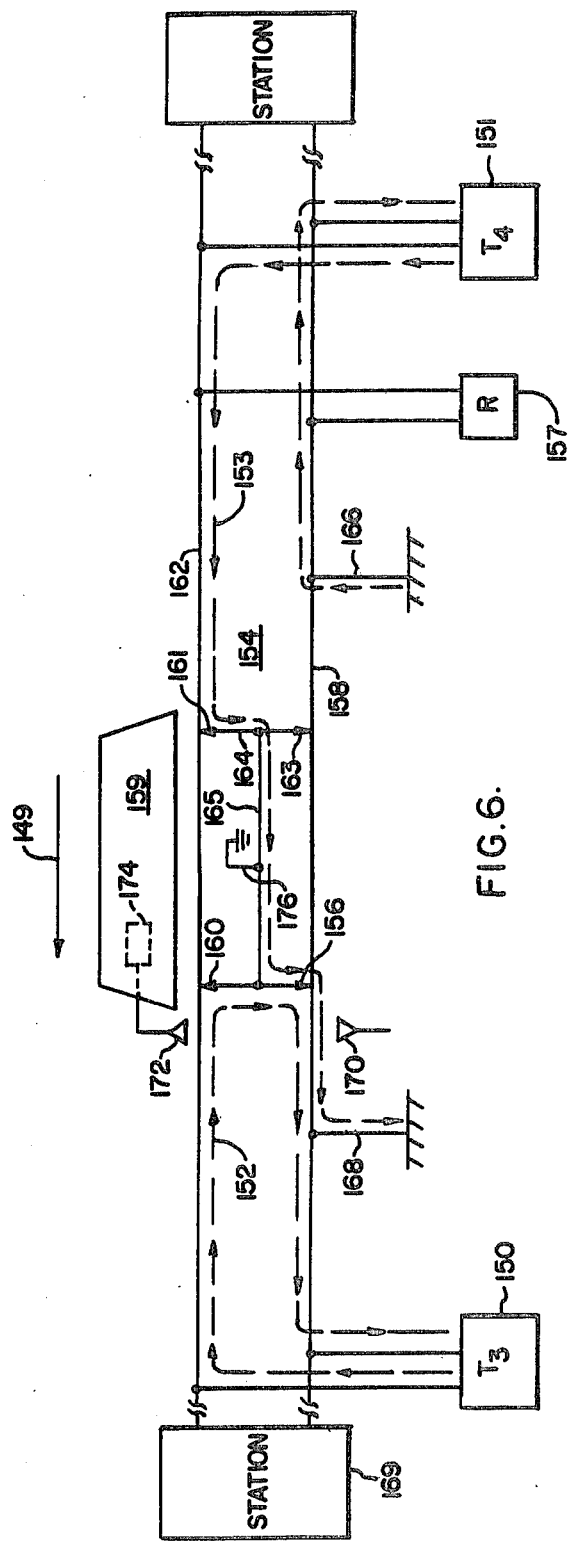
FIG. 6 shows a transit vehicle operative with a single block power distribution network, including a ground rail and signal rail.

In FIG. 6 there is shown the sneak current path provided for a single signal block system, where a transmitter 150 provides a forward direction control signal current 152 in a signal block 154 in which a vehicle car 156 operates as a shuttle back and forth within the single signal block 154. When a rear collector shoe such as collector shoe 163 operative with ground rail 158 has a higher impedance than the collector shoe 161 operative with signal rail 162, a voltage divider effect can be provided. The rear command signal current 153 can pass through the signal rail 162, through the collector shoe 161 and the connection 164 and the body grounded connection 165 to the collector shoe 156 and then through the ground rail 158 to the earth ground 168 and through the earth ground 166 then back through the ground rail 158 to the transmitter 151. This causes the signal antenna 170 to see the rear signal 153, which can cause the train control 174 carried by the vehicle 156 to be confused.

In FIG. 7 there is shown a second embodiment of the present invention applied to a single signal block vehicle track system, with the impedance providing members being connected in each earth ground connection 182, 184, 186 and 188 in relation to particularly the end portions of the signal block 154 and in conjunction with at least one direct earth ground connection 180 being provided in approximately the center of the signal block 154. In effect earth ground connections having a higher impedance are provided for each of the earth ground connections 182, 184, 186, and 188 in comparison to the lower impedance direct hard earth ground connection 180. In this way, the signal current 152 from the transmitter 150 is effectively short-circuited by the collector shoe 160 connected with the collector shoe 156 through connection 167 to indicate occupancy of the vehicle in the signal block 154, and to permit the antennas 170 and 172 positioned in front of the vehicle 157 traveling in the direction indicated by arrow 190 to sense properly the command signal current 152, without the undesired rear signal voltage dividing operation as shown in FIG. 6.

In FIG. 8 there is shown an additional modification of the impedance providing current control apparatus shown in FIG. 3, with a first impedance member 200 connected in series with a second impedance member 202 to provide one branch 204 and a third impedance member 206 connected in series with a fourth impedance member 208 to form a second branch 210 of a parallel arrangement of impedance providing signal current control apparatus to reduce or prevent the passage of the signal current 59 from the rear signal block 60 through the body of the vehicle 10 and into the front signal block 64, where the antennas 56 and 58 positioned ahead of the vehicle 10 when it moves in the forward direction shown by the arrow 54 can sense and be confused by the rear signal current 59 from the rear signal block 60.

Each signal block is fed a control signal at one end to control vehicles running in that signal block in a direction toward that one end and in addition is fed a control signal at the opposite end to control vehicles running in that signal block in a direction toward that opposite end. As a vehicle moves through a given signal block from one end to the other, it is desired that the vehicle respond to the speed command signal from the signal block in front of the vehicle and not respond to the command signal from the signal block to the rear of the vehicle. If the vehicle antennas positioned in front of the vehicle sense any of the control signal from the rear signal block or from a previous signal block, this is due to not complete shunting by the rear collector shoe set which is intended to short-circuit this rear control block signal current. There can be several combinations of sneak signal current paths through the vehicle to pass this improperly shunted rear signal current to the front of the vehicle. The vehicle antennas see whatever control signal or signals are in front of the vehicle and are thereby coupled with the front antennas. For example, the front signal block may be providing a GO command signal at 27 miles per hour and the rear signal block for safety reasons always provides a GO zero mile per hour command signal. The vehicle antennas in front of the front car can see each of the front 27 mile per hour signal and the rear zero mile per hour signal, so this confuses the control apparatus of the vehicle, and the result is that the vehicle stops operation in response to the more safe of the two signals. In addition, the rear signal current sneak paths vary with the location of the earth ground connections 80 and 82 as shown in FIG. 4 and in relation to the vehicle car location.

As shown in FIG. 1, one prior art power distribution arrangement is to mount the power supply rails with the ground rail 42 and the signal rail 46 above the top flange 34 of a center guide beam 36 positioned between the roadway tracks 38 and 40. The vehicle 10 has a front wheel bogie and a back wheel bogie, with each including the power distribution collector shoe apparatus as shown in FIG. 1. In a given signal block the desired speed command signal for the vehicle is supplied to the signal block in front of the vehicle.

As shown in FIG. 2, the front collector shoe 44 operative with the ground rail 42 and the front collector shoe 48 operative with the signal rail 46 are connected together by a connection 47. The rear collector shoe 70 operative with the ground rail 42 and the rear collector shoe 68 operative with the signal rail 46 are similarly connected together by a connection 76. The two connections 47 and 76 are connected together and with the grounded body of the vehicle 10 which is illustrated by connection 78 and which in turn is shown connected to car body ground 79. The ground rail 42 and the signal rail 46 have insulated joint sections 52 and 50, respectively, to provide signal block isolation as required to enable different speed command signals for the respective front signal block 64 and the rear signal block 60. The length of each signal block can vary in accordance with track curves, grades, stations, and other factors.

As shown in FIG. 2, the moving vehicle 10 periodically bridges across the insulated joints 50 and 52 between successive front signal block 64 and rear signal block 60. Assume that for some reason the sliding contact between rear collector shoe 70 and its associated ground rail 42 has an abnormally high impedance that is higher than the impedance of the other collector shoe 68 of the same car rear bogie, which reason may be contamination of the rail or the collector shoe 70 has been physically removed by hitting an obstruction, the normal contact impedance of a collector shoe 70 with its associated rail 42 might be less than one-tenth ohm. However, due to contaminant on the rail, this contact impedance can vary up to several ohms. This causes the undesired one or more sneak paths for the rear signal current 59 as shown in FIG. 2 that go ahead of the car 10 in relation to the front command signal current 62. The return path for this sneak rear signal current 59 is through the earth ground path. The normal command signal current can be about 200 mA (milliamps) and the sneak signal current can be from about 20 mA to about 150 mA. The vehicle control system 11 includes an input signal amplifier coupled with the front antennas 56 and 58 and operative to sense this undesired sneak path rear signal current 59 in front of the vehicle 10 where the control system 11 will respond to them.

The impedance members 90 and 92 as shown in FIG. 3 and according to the present invention reduces the rear sneak path current 59 in front of the vehicle 10 without disturbing the hard earth ground connections 80 and 82 in relation to excessive fault currents from the car to the car body ground 96 for passenger safety.

For a multiple signal block track system such as shown in FIG. 3, with the impedance members 90 and 92 carried by the vehicle car 10, the impedance members are not subject to being damaged by a loose collector shoe and are easier to inspect and maintain in conjunction with scheduled regular maintenance inspection of each car such as every day or every month, as may be desired. Each impedance member 90 and 92 can be checked at that maintenance time to determine that the electrical connection 96 with the car body is good.

As shown in FIGS. 3 and 5, at least one impedance member is provided in the control signal circuit to inhibit the flow of the undesired rear control signal 59. Two impedance members can be provided on each vehicle car as shown in FIGS. 3 and 5, which provides two inductors in parallel to have one-half the impedance for the fault currents to car body ground for safety of the passengers and provides two inductors in series to have double the impedance in relation to the undesired rear control block signal current 59.

As shown in FIG. 6, when a vehicle 159 moves through a signal block 154 in the direction of the arrow 149 the command signal for the vehicle is sensed by antennas 170 and 172 carried ahead of the front wheel bogie. The front wheel bogie has a connection 164 interconnecting the shoe 156 operative with the ground rail 158 and the collector shoe 160 operative with the signal rail 162 to provide a short circuit for the command signal between the ground rail 158 and signal rail 162. This prevents a signal receiver 157 at the rear end of the signal block 154 from sensing the presence of the command signal current 152, to establish that the vehicle 156 occupies the signal block 154. The collector shoes 156, 160, 161, and 163 in FIG. 6 are representative of the associated collector shoes, with the ground rail 158 and the signal rail 162 for the respective front and rear bogies of the vehicle 156, and the connection 165 between the front bogie and the rear bogie represents the conductive and grounded car body.

With the single signal block arrangement of a shuttle system as shown in FIG. 6, the desired speed command signal 152 is provided to the signal block 154 in the front of the vehicle car 156. A second stop command signal 153 is provided by the transmitter 151 to the signal block 154 behind the vehicle car 156 to prevent the car from running into the track end buffer when it reaches the left hand station 169 at the end of its travel in the forward direction. If the reverse and forward direction signals now change to a GO command in what was the reverse direction to move the vehicle to the right, and for some reason the train control 174 did not reverse the motor direction to change the movement direction of the train, an undesired vehicle operation could result. When the signal transmitter 150 for one direction is transmitting a GO command signal, the signal transmitter 151 for the other direction is transmitting a STOP command signal to assure the desired passenger safety. In such a single signal block rail system, each rail includes several physical sections with interconnecting expansion joints to allow for temperature expansion and contraction. For each such expansion joint a connecting wire is provided to electrically bypass the joint, and this wire can become disconnected to modify the integrity of one of the safety ground connections such as 166 and 168 for the respective sections. For this reason a plurality of spaced earth ground connections 166, 168 and so forth is desired as shown in FIG. 6. In practice the front antennas 170 and 172 are set up to be differentially operative to cancel noise currents going the same way in the rails and additive for noise currents going in opposite directions.

In FIG. 7 there is shown a single signal block track system such as a passenger shuttle car provided between two locations and including a hard earth ground connection 180 and several soft earth ground connections 182, 184, 186, and 188 at the ends of the signal block and toward the stations 169 and 171. The hard ground connection 180 comprises a relatively large copper cable with very low impedance, and the soft ground connections comprise the added impedance member 181 included in each such soft ground connection. Since the ground rail 158 and signal rail 162 are mounted on the top flange of the central guide beam as shown in FIG. 1 and that is the main electrical ground of the system, these impedance members 181 are positioned above this guide beam and in relation to the power supply rails located above the guide beam such that there is no interference with the power collection operation of the power collector shoes moving along the power rails as the car 156 moves along the roadway track. If a car-carried collector shoe, such as collector shoe 156, becomes loose and out of its normal position, this moving collector shoe 156 can damage the impedance members 181 that are positioned above the guide beam and in the ground connections as shown in FIG. 7.

In FIG. 7 the single block rail system is shown with one hard ground 180 toward the center of the signal block and a plurality of soft grounds 182 and 184 and 186 and 188 located at the end stations 169 and 171 beyond the normal travel distance of the car. The impedance members 181 in the connections 182, 184, 186, and 188 are readily inspectable and protected from cars moving over them so the moving cars will not interfere with the operation of the provided ground connections, and the more important passenger loading and unloading positions in the stations are fully protected against fault current conditions by the car body ground connection 176 of the car 159.

One practical example of a suitable impedance member as shown in FIGS. 3, 5, 7 and 8 with signal frequencies of about 5 to 10 kHz and having the capability of carrying system fault currents is a Model No. CL12-24 inductor made and sold at the present time by the Signal Transformer Company of Inwood, N.Y. 11696. It provides a low impedance value at 60 Hz and a satisfactory high value of impedance for the above 5 to 10 kHZ command signal frequencies. This inductor has an inductance L equal to 1.2 mH (millihenry), a DC resistance of 0.013 ohm, a 60 Hz impedance of 0.465 ohm, a 5 kHz impedance of 37.69 ohms, and a 10 kHz impedance of 75.38 ohms. The vehicle-to-ground 60 Hz impedance is normal 0.233 ohm and the worst case with one inductor choke failure and one winding of second inductor choke open is 0.930 ohm.

We claim:

1. In signal apparatus for a vehicle having a front end and a rear end and operative with a roadway track having an earth ground potential, said apparatus including first and second signal rails coupled with a first signal transmitter for providing a first control signal current in front of said vehicle and coupled with a second transmitter for providing a second control signal current in the rear of said vehicle, with said vehicle being responsive to a control signal current in front of the vehicle above a predetermined threshold level, the combination of:

first signal collector means carried at the front end of the vehicle and providing a normal low impedance coupling between the first and second signal rails,
second signal collector means carried at the rear end of the vehicle and providing a normal low impedance coupling between the first and second signal rails,
a first conductive circuit connected between the first and second signal collector means, a second conductive circuit coupled between the first signal rail and said earth ground potential and conducting one of the first and second control signal currents when one of the first and second signal collector means has a higher than said normal low impedance coupling between the first and second signal rails, and
impedance providing means connected within one of the first and second conductive circuits to reduce said one control signal current in the second conductive circuit to below said predetermined threshold level.

2. The signal apparatus of claim 1, with the first conductive circuit being operative to conduct the second control signal from the rear to the front of said vehicle when the second signal conductor means has a higher than said normal low impedance, and with the impedance providing means being connected in the first conductive circuit to reduce said second control signal to below the predetermined threshold level.

3. The signal apparatus of claim 1, with the first control signal current in front of the vehicle being above the predetermined threshold level to determine the operation of the vehicle.

4. The signal apparatus of claim 1, with the vehicle including control signal sensing means positioned in front of the first signal collector means and responsive to control signal current in front of the first signal collector means.

5. The signal apparatus of claim 1, with the impedance providing means being connected in the second conductive circuit to reduce the second control signal in front of the vehicle to below the predetermined threshold level.

6. The signal apparatus of claim 1, with the vehicle being operative with propulsion power having a first frequency and with the second control signal current having a second and higher frequency, and with said impedance providing means being selected to have a higher impedance value at the second frequency than at the first frequency.

7. The signal apparatus of claim 1, with the vehicle being operative with low frequency power current in relation to the higher frequencies of the first and second control signals, such that the impedance of the impedance providing means is higher in relation to the first and second control signal currents.

8. In a method of providing a control signal to determine the operation of a vehicle having a front end and a rear end and being movable toward the front end along a track having an earth ground potential, said track including a pair of signal rails having a first control signal in front of the vehicle and a second control signal in the rear of the vehicle, the steps of providing a first low impedance circuit at the front end of the vehicle between the pair of signal rails,
providing a second low impedance circuit at the rear end of the vehicle between the pair of signal rails,
providing a first conductive circuit through the vehicle between the first and second low impedance circuits,
providing a second conductive circuit from one of the signal rails to said earth ground potential, and
providing an impedance member in one of the first and second conductive circuits and having an impedance value in relation to each of the first and second control signals for preventing the second control signal from controlling the operation of said vehicle.

9. The method of providing a control signal to determine the operation of a vehicle of claim 8, with the vehicle having a propulsion power frequency lower than the higher frequencies of the first and second control signals, and with the impedance member being provided in the first conductive circuit to prevent the higher frequency second control signal at the rear of the vehicle from controlling the operation of said vehicle.

10. The method of providing a control signal of claim 8, with the impedance member being provided in the second conductive circuit to prevent the second control signal from controlling the operation of said vehicle.

* * * * *